(12) United States Patent
Darr

(10) Patent No.: US 6,641,881 B1
(45) Date of Patent: Nov. 4, 2003

(54) LINER AND PREFORM

(75) Inventor: Richard C. Darr, Medina, OH (US)

(73) Assignee: Plastipak Packaging, Inc., Plymouth, MI (US)

( * ) Notice: Subject to any disclaimer, the term of this patent is extended or adjusted under 35 U.S.C. 154(b) by 256 days.

(21) Appl. No.: 09/717,985

(22) Filed: Nov. 21, 2000

Related U.S. Application Data

(63) Continuation of application No. 09/028,840, filed on Feb. 24, 1998, now Pat. No. 6,203,870.

(51) Int. Cl.$^7$ .......................... B62D 23/00; B65D 1/00
(52) U.S. Cl. ................ 428/35.7; 428/36.6; 428/36.91; 428/542.8; 212/12.2; 212/382; 212/383; 212/384; 212/62.22; 220/669; 220/675
(58) Field of Search ................ 428/35.7, 36.6, 428/36.91, 542.8; 212/12.2, 382, 383, 384, 62.22; 220/669, 675

(56) References Cited

U.S. PATENT DOCUMENTS

| | | | |
|---|---|---|---|
| 3,229,840 A | 1/1966 | Filleul ........................ 215/2 |
| 3,759,437 A | 9/1973 | Amberg ................... 229/1.5 B |
| 3,961,113 A | 6/1976 | Marco ........................ 428/35 |
| 4,079,851 A | 3/1978 | Valyi ........................ 215/1 C |
| 4,109,813 A | 8/1978 | Valyi ........................ 215/1 C |
| 4,192,429 A | 3/1980 | Yerman ...................... 215/307 |
| 4,307,137 A | 12/1981 | Ota et al. ..................... 428/35 |
| 4,330,066 A | 5/1982 | Berliner ..................... 215/12.1 |
| 4,592,475 A * | 6/1986 | Hannon et al. ............. 215/252 |
| 4,649,068 A | 3/1987 | Collette ........................ 428/35 |
| 4,797,244 A | 1/1989 | Sauer ......................... 264/266 |
| 4,838,464 A | 6/1989 | Briggs ........................ 222/478 |
| 4,868,026 A | 9/1989 | Shimizu et al. ............. 428/36.7 |
| 5,046,627 A | 9/1991 | Hansen ......................... 215/31 |
| 5,181,615 A * | 1/1993 | Thompson ..................... 156/69 |
| 5,366,774 A | 11/1994 | Pinto et al. .............. 428/36.92 |
| 5,464,106 A | 11/1995 | Slat et al. ................. 215/12.1 |
| 5,503,886 A * | 4/1996 | Guarriello et al. .......... 215/370 |
| 5,645,183 A | 7/1997 | Slat et al. ................. 215/12.2 |
| 5,651,933 A | 7/1997 | Slat et al. .................... 264/250 |
| 5,660,902 A | 8/1997 | Unterlander et al. ....... 428/35.7 |
| 5,676,267 A | 10/1997 | Slat et al. ................. 215/12.1 |
| 5,698,241 A | 12/1997 | Kitzmiller ................... 425/532 |
| 5,756,018 A | 5/1998 | Valyi ......................... 264/40.1 |
| 5,756,172 A | 5/1998 | Semersky ................. 428/36.92 |
| 5,759,654 A | 6/1998 | Cahill ...................... 428/36.91 |
| 6,203,870 B1 * | 3/2001 | Darr ......................... 215/12.2 |

FOREIGN PATENT DOCUMENTS

| | | |
|---|---|---|
| EP | 0 312 134 A | 4/1984 |
| EP | 136222 A2 | 4/1985 |
| EP | 0 627 297 A | 5/1994 |
| GB | 6740 A | of 1897 |
| GB | 14237 A | of 1907 |
| WO | WO 97/10089 | 9/1996 |

* cited by examiner

*Primary Examiner*—Kenneth R. Rice
(74) *Attorney, Agent, or Firm*—Rader, Fishman & Grauer PLLC

(57) ABSTRACT

An improved multi-layer preform is provided which includes: (a) a plastic inner liner, having a cylindrical-walled lower portion and a cylindrical-walled upper portion integral with and extending upwardly from said lower portion, and (b) a molded outer layer. The liner further includes (a) a mount means, such as a generally continuous annular groove, or (b) a vent means, such as a plurality of recesses or grooves positioned circumferentially about the upper portion of the liner, or (c) both a mount means and vent means used in functional combination.

18 Claims, 6 Drawing Sheets

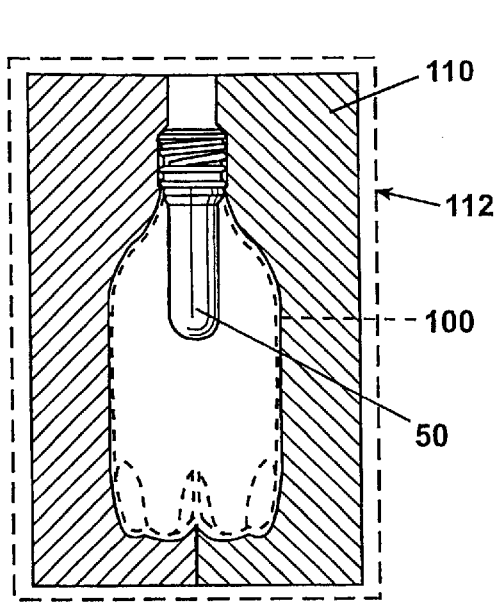
Fig. 14
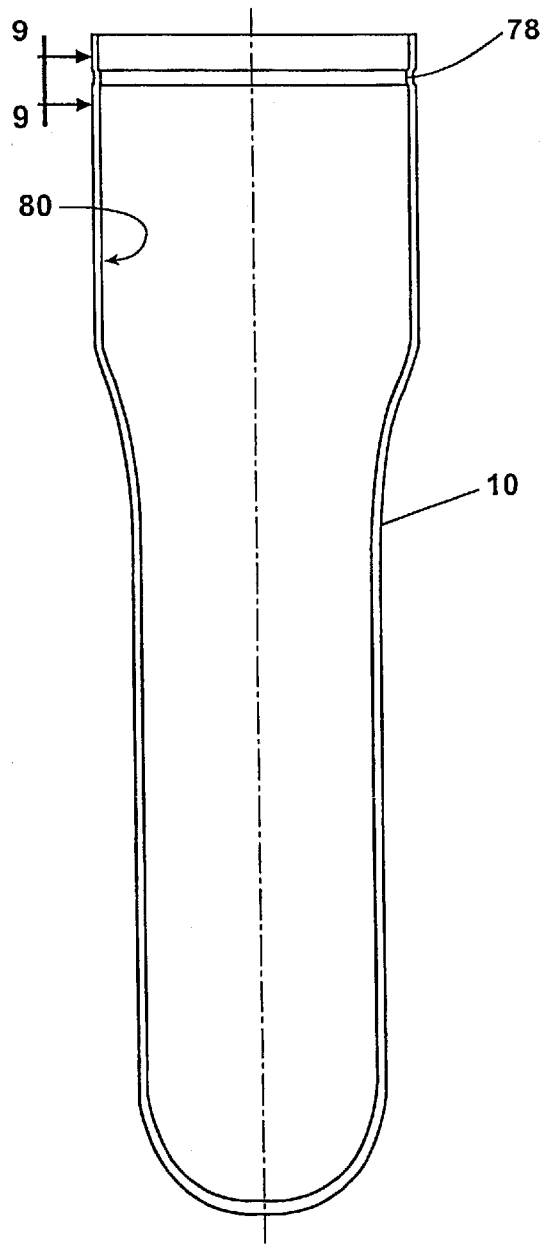
Fig. 8
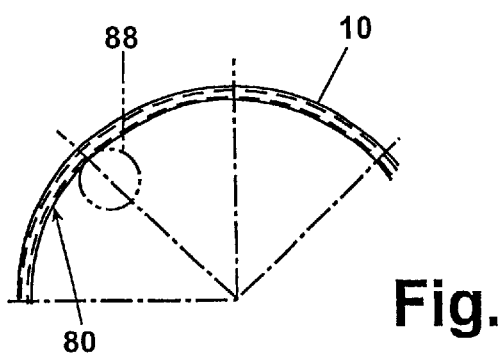
Fig. 9
Fig. 12

LINER AND PREFORM

RELATED APPLICATIONS

This application is a continuation of U.S. patent application Ser. No. 09/028,840, filed on Feb. 24, 1998, now U.S. Pat. No. 6,203,870.

TECHNICAL FIELD

This invention is directed toward improved preform liners, and more particularly to multi-layered preforms having a liner with improved functional characteristics.

BACKGROUND ART

Traditional two-stage blow molding of plastic hollow articles, typically involve the manufacture of a preform, or parison, the placement of the preform within a split, female mold, and the molding of the preform into its resultant shape under pressure. The preform or parison can be produced in any number of a variety of methods, all of which are well-known. Some examples of common preform production methods include, but are not limited to, extrusion molding, injection molding, compression molding, thermoforming, or various combinations and derivatives of these techniques.

In recent years, multi-layered containers have become popular and widely used in the field of hollow plastic containers. Multi-layered preforms and containers are typically manufactured to allow for the use of different materials in specific layers wherein each material has particular properties adapted to perform a desired function. To make better and more economical use of the various plastic material components, it is often desirable to construct a preform having a comparatively thin inner layer of a generally more expensive first polymer and a comparatively thicker outer layers of less expensive and/or less desirable polymers.

In some applications, a relatively thin inner layer may be used to prevent the intended contents of the final article from direct contact with the outer wall of the container. In other cases, the goal of a certain layer of material may be to provide an additional gas or oxygen barrier in order to reduce the amount or rate of permeation through the walls of the container. The form of layering employed can be tailored to serve multiple purposes and to meet various functional needs.

While various techniques may be applied to manufacture such multi-layered preforms, the present invention is particularly well-suited to processes which incorporate the use of a comparatively thin-walled cylindrical inner liner, or "sleeve," generally having a generally-closed bottom portion and an open neck. Such liners and preforms can be manufactured through a wide variety of processes, including those represented in the following devices and methods.

For example, U.S. Pat. No. 4,109,813 discloses the manufacture of a multi-layered preform which includes the placement of a preformed sleeve over a core in a parison mold and injecting a parison around the core and sleeve within the mold. The disclosure teaches that once the core is inserted into a sleeve, a vacuum may be employed to blow the parison into the final shape and the sleeve will be caused to be pressed against the core so that it will remain attached thereto.

U.S. Pat. No. 5,464,106 discloses a multi-layer preform and container comprised of an inner layer having variable thickness in addition to an outer layer. One specified method of forming the multi-layered preform involves the extrusion (or co-extrusion) of the liner, forming the liner into its final shape via blow molder, and then moving the liner to an injection molder where the outer layer is then formed.

In multi-layer applications such as the foregoing, it is important, and often critical, that the liner remains properly seated on the corresponding core rod prior to the subsequent molding of an outer layer. This is true regardless of whether the outer layer is produced by injection molding, compression molding, or other manufacturing techniques. Therefore, by introducing design enhancements to the physical structure of the liner, the seating of the liner can be improved, and the resultant article will be produced with more efficiency, with improved consistency, and with less variation.

DISCLOSURE OF INVENTION

Accordingly, an object of this invention is to provide a preform liner with improved handling characteristics.

Another object of this invention is to provide a preform liner which will improve the processing and formation of multi-laye red preforms and the resultant containers.

A further object of the present invention is to provide a preform liner in which the physical attachment of a liner to a corresponding core is improved, thereby reducing the associated compression resistance encountered with further processing.

Yet another object of this invention is to provide a multi-layered preforms and containers which exhibit improved dimensional characteristics.

In carrying out the above objects, an improved multi-layer preform is formed which includes: (a) a plastic inner liner, having a cylindrical-walled lower portion and a cylindrical-walled upper portion integral with and extending upwardly from said lower portion, and (b) a molded outer layer. The liner further includes (a) a mount means, such as a generally continuous annular groove, or (b) a vent means, such as a plurality of recesses or grooves positioned circumferentially about the upper portion of the liner, or (c) both a mount means and vent means used in functional combination.

The objects, features and advantages of the present invention are readily apparent to those skilled in the art from the following detailed description of the best modes for carrying out the invention and appended claims when taken in connection with the following drawings wherein like reference characters depict like elements.

BRIEF DESCRIPTION OF THE DRAWINGS

FIG. 8 is an elevational and cross-sectional view of the liner showing a mount feature in the form of an annular band.

FIG. 9 is an enlarged cross sectional view of a portion of the side wall of the liner taken generally along line 9—9 of FIG. 8.

FIG. 12 is a partial top view of the upper portion of a liner showing one means for forming recesses or vents in the inner surface of the liner.

FIG. 14 is an elevational view showing the process of blow molding a preform into the container.

BEST MODE FOR CARRYING OUT THE INVENTION

Figure 1:
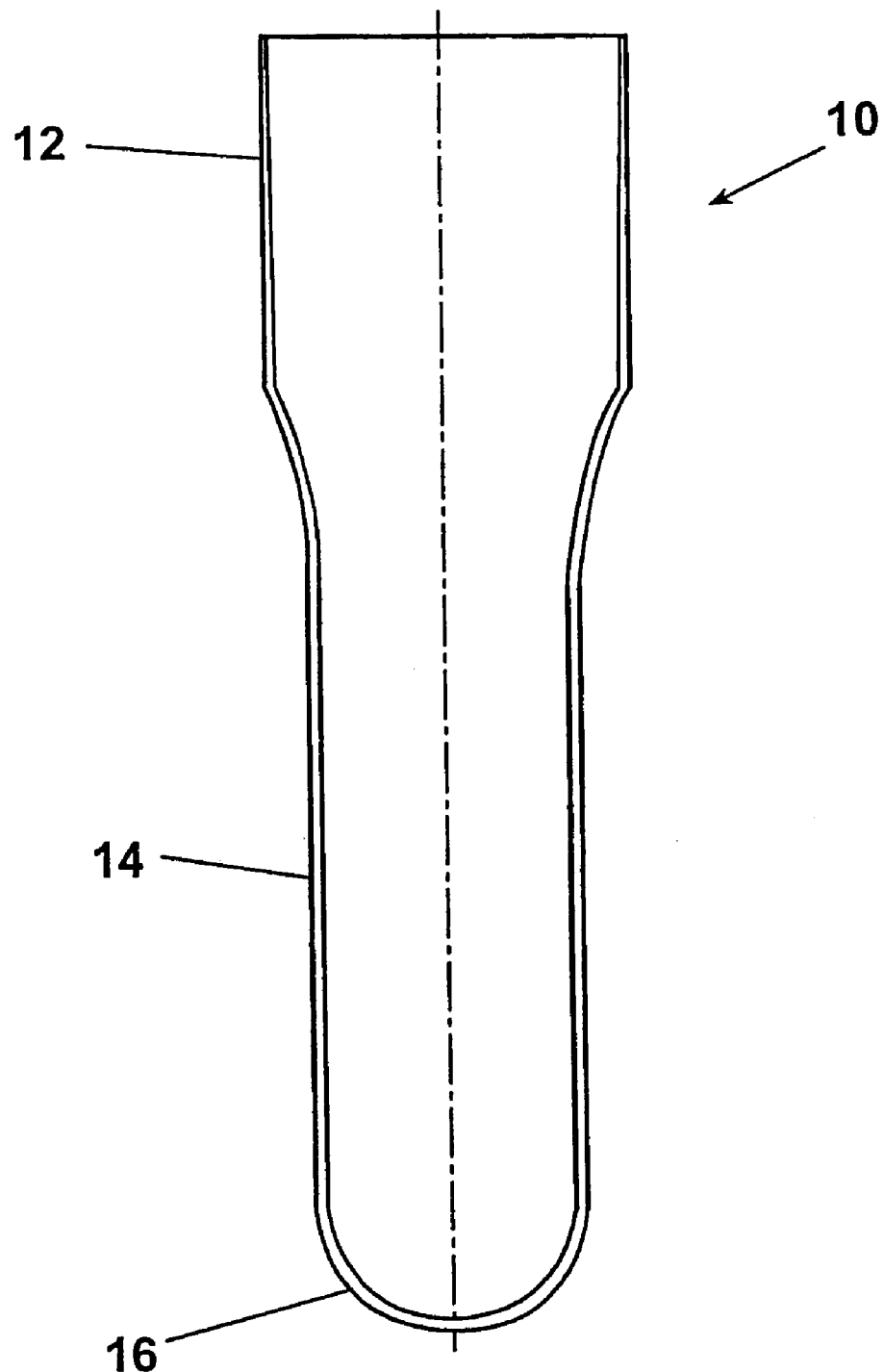
FIG. 1 is an elevational view of a mono-layered plastic liner.

Referring now to the drawings in detail, wherein like reference numerals and letter designate like elements, there is shown in FIG. 1 an elevational view of a single- or mono-layer liner, also referred to as a preform sleeve, designated generally as 10. The liner 10 further includes an upper portion 12, a lower portion 14, and a closed bottom portion 16. The thickness of the liner 10 may vary along its length. There may or may not be any dimensional differences distinguishing the upper and lower portions and the lengths of each portion can each be adjusted to fit the functional needs of a given application. In applications involving a threaded preform, the length of the upper portion 12 of the liner 10 will usually be at least the length of the threaded portion of the molded outer layer.

The liner 10 itself can be formed from a variety of plastic materials. Some of the more common plastics include, but are not limited to, polyethylene terephthalate (PET), polyethylene naphthalate (PEN), ethyl vinyl alcohol (EVOH), polypropylene and/or various combinations or blends of the forgoing or other thermoplastics. However, in the majority of cases, particularly those in which the finished article will hold contents fit for human consumption, the innermost layer of the liner 10 will be formed from virgin PET or some other FDA-approved resin.

The liner 10 can may be formed by an extrusion process, such as that disclosed in U.S. Pat. No. 5,464,106, by a thermoforming process, such as that taught by U.S. Pat. No. 5,443,766, by an injection molding process, by a compression molding process, or any other process commonly used for forming thin-walled, shaped plastic articles. In the case of most thin-walled articles, especially those in which it is desirable to have controlled wall thickness along its length, extrusion is the preferred processing technique for forming a thin-walled liner 10.

Figures 2, 3:
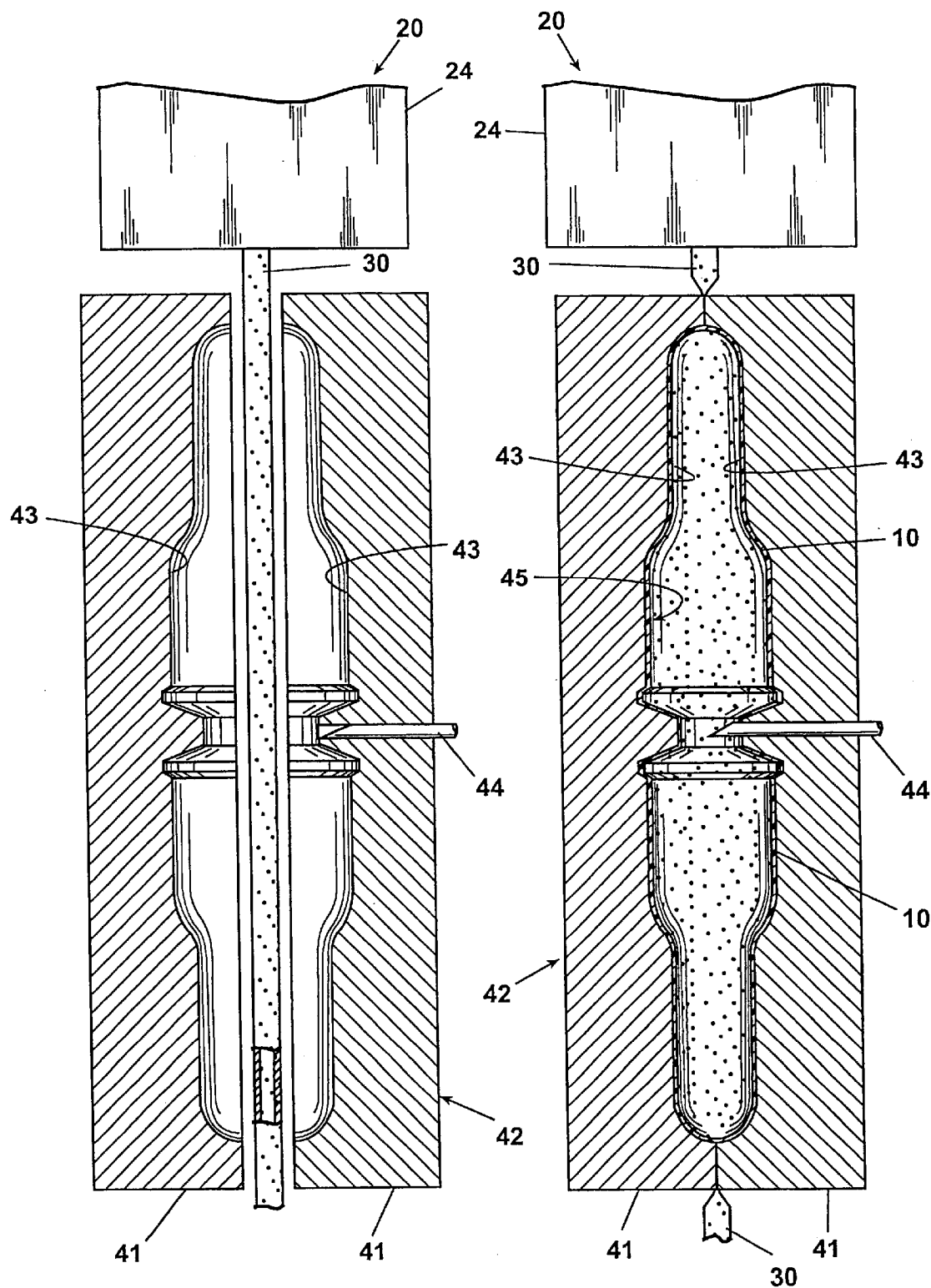
FIG. 2 is a sectional view taken through extrusion blow molding apparatus for extruding a an extrudate between open mold sections of a mold.
FIG. 3 is a view similar to FIG. 1 but showing the apparatus after the mold has been closed to blow mold the extrudate to provide a pair of liners.
Figure 4:
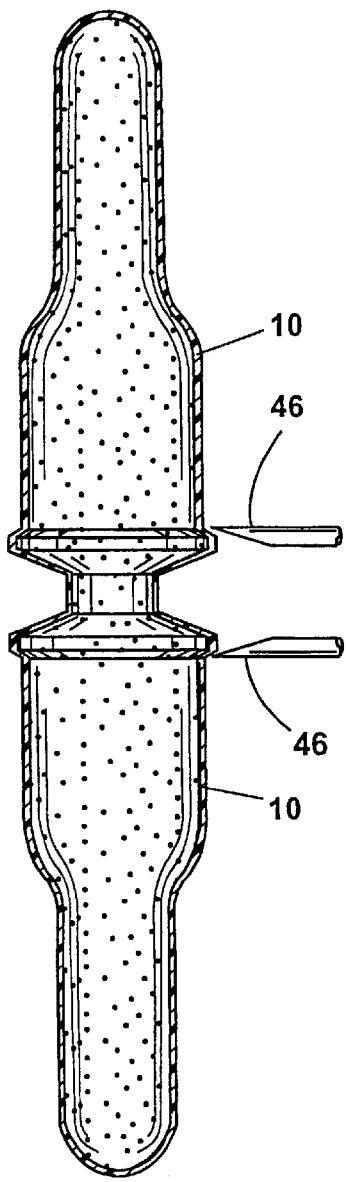
FIG. 4 is a view illustrating how the pair of liners shown in FIG. 3 are separated from one another.

FIGS. 2 through 5 show, in more particular detail, one of several types of processes that can be used to form a liner and resultant preform. FIG. 2 depicts an extrusion apparatus 20 and an extruder 24. The melt is forced through a die to form a generally cylindrical extrudate 30. A melt thickness-adjusting device (not shown) can be used, as desired, to vary the thickness of the extruded member 30 along its length. Depending upon the part design and the capabilities of the extruder, additional layers can be co-extruded as desired. In addition to the possibility of being composed of multiple layers, the liner 10 may be made of more than one material in its various parts. For example, if desired, the liner side walls could be made of a material that is different from the material in the bottom of the liner.

The extrudate 30, typically exits the extruder 20 in one continuous length, most commonly having a substantially cylindrical or tube-shaped form. As shown in FIG. 2, a hot parison or extrudate 30 is extruded between open mold sections 41 of an open blow mold 42. As shown in the depicted embodiment, the mold cavities 43 define the shape of a pair of liners 10 that are connected at their ends which are located adjacent the open ends of the resultant preform after its injection molding as hereinafter more fully described. One of the mold sections 41 includes a blow needle 44. As illustrated in FIG. 3, the blow needle is inserted into the extrudate 30 in connection with the mold closing to blow the extrudate 30 to the shape of the enclosed mold cavity 45. Where higher production output is desired, a series of molds can be used. An example of such a method is described in connection with the rotary blow molding machine of U.S. Pat. No. 5,698,241.

After the extrusion and blow molding of the liners 10 (as in the embodiment depicted), the mold 42 is opened to remove the liners 10. Where multiple liners are produced in connection with one another, the liners 10 can then be separated in any suitable manner, such as by cutting by the schematically illustrated knives 46 shown in FIG. 4.

Figure 5:
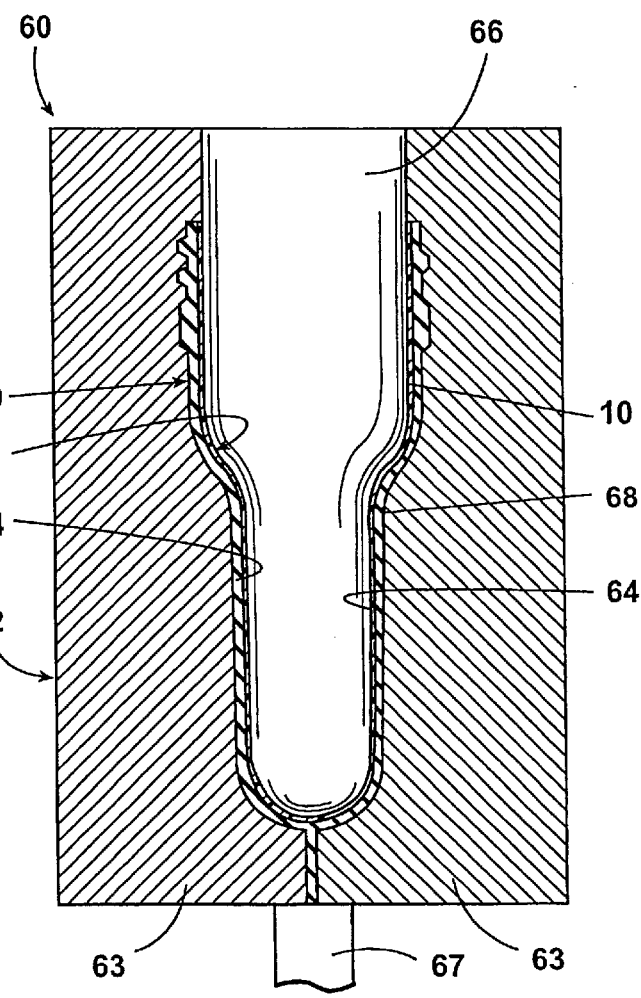
FIG. 5 is a view that illustrates injection molding apparatus for injection molding an outer layer around the liner to provide a multi-layered preform.

With reference to FIG. 5, the injection molding apparatus 60 includes a mold 62 having a pair of mold sections 63 that define mold cavity sections 64 for cooperatively defining a mold cavity 65 in the closed position illustrated. The liner 10 is positioned on a core pin 66 of the injection molding apparatus 60 and is received within the cavity 64 of the closed mold 62 to commence the injection molding processing. An injector 67 injects a resin into the cavity 64 about the liner 10 to provide an outer layer 68 to form a preform 70.

Figure 6:
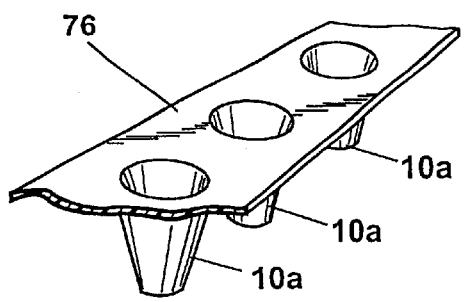
FIG. 6 is a perspective view of a portion of a sheet having a plurality of thermoformed liners prior to severing.

The production of acceptable liners and preforms resulting therefrom is not limited to the method described above. Other methods for producing the liner 10 and the resultant preform are contemplated. For example, FIG. 6 depicts a plurality of wide-mouth liners 10a which have been thermoformed from a sheet of polymer material 76. Such liners 10a may then be separated from 29, the sheet by any suitable method. The wide-mouth liner 10a generally has a larger mouth or opening diameter relative to the sidewall diameter of the preform and the finished article than the same comparative measurements of the liner 10 of FIG. 1. With such dimensions, the wide-mouth liner 10a is more typically formed by thermoforming, injection or compression processes, rather than by an extrusion process.

Figure 7:
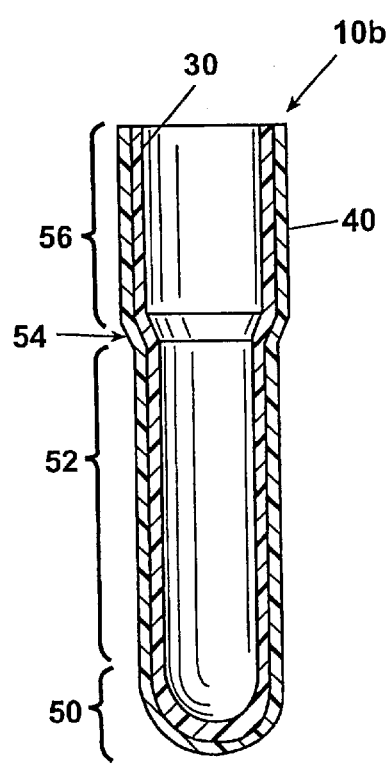
FIG. 7 is an elevational and cross-sectional view of a multi-layer plastic liner having a tapered shoulder portion.

We next refer to FIG. 7, in which a preferred embodiment of a multi-layered liner 10b is shown. The multi-layered liner 10b includes multiple layers having a lower closed portion 50, a side wall portion 52, a tapered cylindrical wall-shaped shoulder portion 54, and an upper portion 56 located above the shoulder portion 54. As long as the liner 10b can be properly transported and handled on core pins or other handling means, the precise shape and taper of the shoulder portion 54 is not critical. The multi-layered liner 10b is further comprised of an inner layer 30 and an outer layer 40. When producing containers designed to hold contents for human consumption, the inner layer 30 is comprised of a polyester material which is acceptable for such a purpose. The outer layer generally will not contact the contents and generally can be comprised of less expensive polyester resins. In practice, the multi-layered liner 10b should not be limited to just an inner and outer layer and may consist of any number of multiple layers taken along cross sections of all or a portion of its length.

It is often desirable to utilize thin inner and/or barrier layers. Therefore, for functional, as well as commercial reasons, the liner 10b will preferably be formed by either an extrusion or co-extrusion process. However, thermoforming, injection molding, compression molding, or other processes known in the art can be employed in various combinations to produce similar multilayered structures.

Whether through vacuum techniques or other mechanical operations, the liner will later be positioned onto a core rod and thereafter placed within a mold. An outer layer of a polymer is then injection or compression molded around the liner to form the preform. To position the liner onto the core rod in a more stable manner, and to further insure that the liner resists unintended and premature separation from the pin, the liner 10 is formed to includes a mount means. The mount means typically consists of at least one inwardly-projecting protrusion and is specifically designed to make the subject liner fit more snugly onto the core pin. FIG. 8 shows a mount means taking the form of an annular ring or band 78 that extends inwardly from the inner surface 80 of the liner 10. The mount means can be formed as part of the liner itself during its formation or can later be formed by any acceptable processing technique practiced before the positioning of the liner upon the injection mold core pin.

FIG. 9 is an enlarged cross-sectional view of a portion of the annular ring or band 78 of FIG. 8 taken along the line 9—9. The extent of the indentation of the ring or band 78, designated by the letter T, which is typically within the range of five to fifteen thousandths of an inch, should be sufficient to assist with the intended pressure contact of the liner to the pin. At the same time, the amount of indentation T should not being so large as to impermissibly impede the proper placement of the liner onto the core rod. Practically speaking, the design and sizing of the protrusion or protrusions is tailored to the interaction of the materials, especially their frictional effects, and the inner diameter of the liner and the external diameter of the rod taken along the respective length of contact.

In the preferred embodiment, the liner 10 further includes at least one vent means recessed in the inner surface 80 of the upper portion 56 of the liner 10. The primary purpose of the vent means is to assist in the displacement of air and any other gases from the interior of the liner as it is positioned upon the core rod. Without sufficient "venting," the internal pressure of the gas trapped and compressed within the internal portion of the liner may resist the proper placement of the liner upon the rod. A coordination of the vacuum effect generated from the rod and the design of functionally sufficient functional venting means in the liner can optimize the positioning of the liner onto the core rod. Consistently better placement of the liner onto the core rods inherently results in the production of preforms with more consistent dimensional features.

Figures 10, 11:
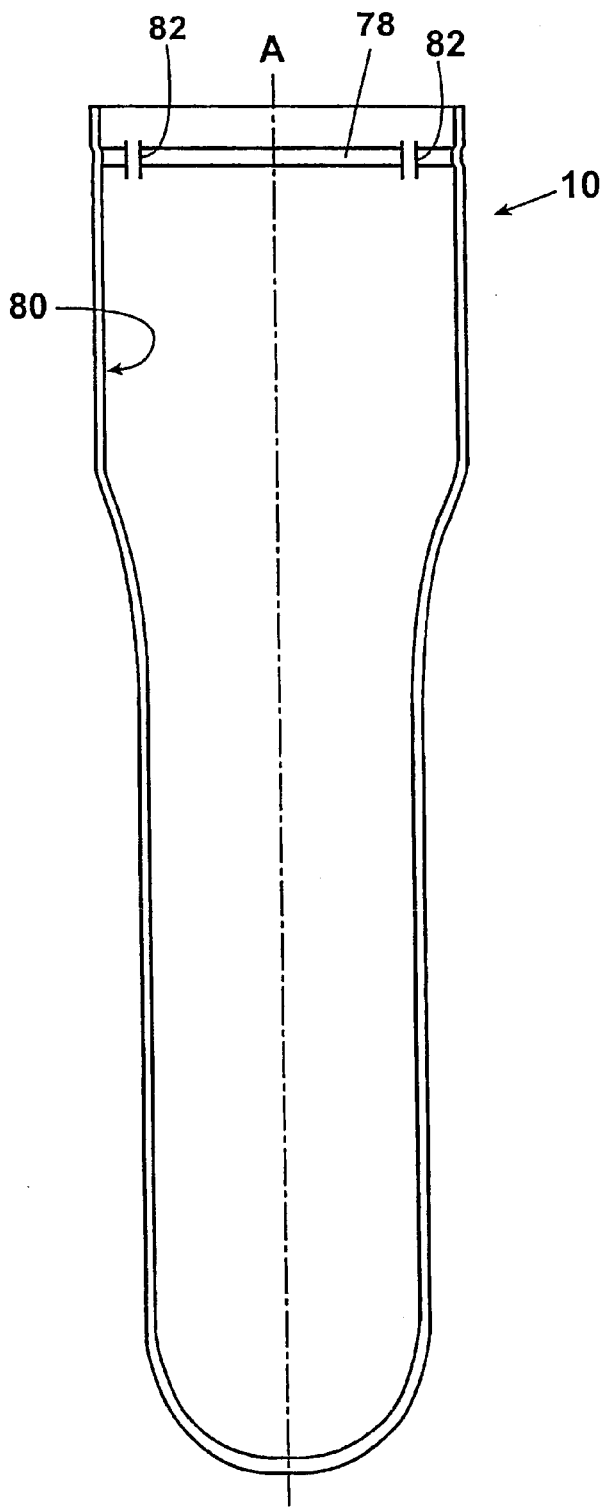
FIG. 10 is an elevational and cross-sectional view of one embodiment of a liner having both a mount feature and vent recesses.
FIG. 11 is a top view of the liner shown in FIG. 10.

FIG. 10 shows an elevational and cross-sectional view of a liner 10 having both an annular band 78 and a plurality of channels or grooves 82 serving as a vent means. FIG. 11 is a top view of the liner illustrated in FIG. 10. As generally shown in FIGS. 10 and 11, the vent means can take the form of one or more channels or grooves 82 located on the inner surface 80 of the liner 10. The number, sizing and shape of the vent means may be designed and adjusted to obtain the desired displacement of internal gases associated with the seating of the liner 10.

In the preferred embodiment, four channels or grooves 82 are equally spaced from one another at the same longitudinal height along the inner circumference of the upper portion 56 of the liner 10. Each individual groove 82 extends longitudinally along the inner surface 80 of the liner 10 in a direction generally parallel to that of the central axis A.

FIG. 12 shows a ball mill 88 positioned at designated locations on the inner surface 80 of the liner 10 to create channels or grooves as the vent means. While the ball mill 88 creates generally semi-circular channels or grooves 82, the particular shape of the passage comprising the vent means is not critical per se. In practice, the vent means can be sized and designed to take on an almost infinite number of shapes or patterns. Furthermore, the vent means can be formed by any suitable manufacturing operation known to those in the art. For example, rather than using a ball mill (as shown), the vent means could take the form of longitudinal notches cut into the inner surface of the liner by a blade, or other cutting means, at specified positions. The escape passage area corresponding to a given vent means can be sized and shaped to provide the desired rate of displacement associated with an individual liner design.

Figure 13:
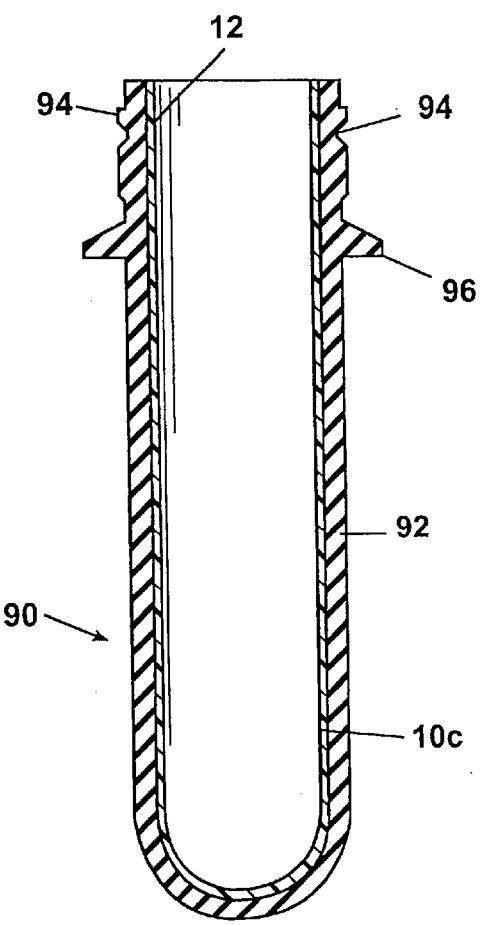
FIG. 13 is an elevational and cross-sectional view of a preform molded over a plastic liner in which the liner has straight-walled cylindrical upper and lower sections.

FIG. 13 displays a multi-layered, composite preform 90 having a pressure molded outer layer 92 and a straight-walled, mono-layer liner 10c. Notably, the preform also includes a threaded neck 94 positioned generally adjacent to the upper open-ended portion 12 of the liner 10c and a fairly conventional retaining flange 96 The molded outer layer or layers are preferably injection molded, but other known manufacturing techniques, such as compression molding, can also be used.

The liner 10 will generally adhere to the molded outer layer 92 and may at times bond directly thereto at temperatures normally used for molding the latter material. To facilitate such bonding, the outer surface of the liner 10 may be treated by procedures that are known in the art to promote the adhesion of the plastic surfaces. In some instances, prior to molding the outer molded layer 92, it may be desirable to further coat the outer surface of the liner 10 with an additional plastic material, such as a barrier. For instance, such an additional layer, or coating, can be sprayed directly onto the outer surface of the liner or the liner could be dipped into a solution containing the desired material.

While FIG. 13 depicts a straight-walled liner 10c, it must be emphasized that the liner and preform contemplated be this invention may have any number of shapes, thickness dimensions and layering structures in addition to those specifically disclosed. In practice, the design of the multi-layered preform will usually be chosen to optimize the necessary or desired functional features and economic considerations associated with the preform and the final resultant article.

Referring now to FIG. 14, a process for forming the resultant container 100 will now be described. The process for forming the container 100 includes the processes described above for forming the preform 80. After an outer layer 92 is added to the liner 10 and the desired preform 80 is removed from the molder 60, the preform 90 is placed into a blow mold 110 shown in FIG. 14. Before placing the preform 90 into the blow mold 110, it may be necessary to reheat the preform. If the preform is immediately removed from the injection molder 60 and placed in the blow molder 112, shown by dotted lines in FIG. 14, the preform 90 may already be sufficiently heated. Otherwise, the preform 90 should be placed in a heater (not shown) prior to placement in the blow molder 112.

With continuing reference to FIG. 14, the preform 90 is placed in the blow mold 110 and held securely therein via engagement of the mold to the threaded neck 94 of the preform 90. Once proper placement of the preform 90 is established, blow molder 112 is used to blow preform 90 into the shape of the container 100. After the preform 90 is formed into the intended article, the blow mold 110 is opened and the completed container 100 is removed.

Although the above description contains many specific references to detailed information, such specificity should not be construed as limiting the scope of the invention, but as merely providing an illustration of some of the presently preferred embodiments of the invention. Obviously, numerous modifications and variations of the present invention are possible in light of the above teachings. It is therefore understood that the invention may be practiced other than as specifically described herein and the scope of the invention should be determined by the appended claims and their legal equivalents, rather than by the examples given.

What is claimed is:

1. An improved inner liner for manufacturing a plastic preform having a closed bottom, a lower portion integral with and extending upwardly from said bottom portion, and a substantially cylindrical upper portion integral with and extending upwardly from the lower portion, the upper portion having an open neckand an upper rim; the liner further includes an interior surface, an exterior surface, and an integral mount means including a substantially continuous annular ring projecting inwardly from the interior surface to facilitate engagement of the liner to an internal projection, wherein the liner is multilayered.

2. A liner as recited in claim 1, wherein the mount means is positioned on the upper portion of the inner liner.

3. A liner as recited in claim 2, wherein the mount means is positioned below the upper rim of the inner liner.

4. A liner as recited in claim 1, wherein the annular ring includes intermittent interruptions in the annular continuity of the ring.

5. A liner as recited in claim 1, wherein the liner includes a central longitudinal axis and the thickness of the liner varies along the direction of the longitudinal axis.

6. A liner as recited in claim 1, wherein the liner is at least one of the following: extrusion blow-molded, injection-molded, thermoformed, and compression molded.

7. A liner as recited in claim 1, wherein the liner includes a barrier material.

8. A liner as recited in claim 1 wherein the substantially cylindrical upper portion includes a tapered cylindrical wall-shaped shoulder portion positioned below the upper portion.

9. An improved inner liner for manufacturing a plastic preform having a closed bottom, a lower portion integral with and extending upwardly from said bottom portion, and a substantially cylindrical upper portion integral with and extending upwardly from the lower portion, the upper portion having an open neck and an upper rim; the liner further includes an interior surface, an exterior surface, and an integral mount means including a substantially continuous annular ring projecting inwardly from the interior surface to facilitate engagement of the liner to an internal projection, wherein the liner further includes a vent means including a plurality of channels in the annular ring of the mount means to permit the escape of gas from the internal cavity of the liner when the liner is affixed to said internal projection.

10. An improved inner liner for manufacturing a plastic preform having a closed bottom, a lower portion integral with and extending upwardly from said bottom portion, and a substantially cylindrical upper portion integral with and extending upwardly from the lower portion, the upper portion having an open neck and an upper rim; the liner further includes an interior surface, an exterior surface, and a vent means having a plurality of channels recessed in the internal surface of the liner to permit the escape of gas from the interior surface of the liner when the liner is affixed to an internal projection; wherein the liner is multi-layered and includes a barrier material.

11. A liner as recited in claim 10, wherein the channels are circumferentially spaced.

12. A liner as recited in claims 10, wherein the liner includes a central longitudinal axis and the channels generally extend in a direction generally parallel to the central longitudinal axis.

13. A liner as recited in claim 10, wherein the substantially cylindrical upper portion includes a tapered cylindrical wall-shaped shoulder portion positioned below the upper portion.

14. A liner as recited in claim 10, central longitudinal axis and the thickness of the liner varies along the direction of the longitudinal axis.

15. A plastic container prepared from a multi-layered plastic preform, the container including an inner liner and a molded outer layer substantially adjacent to the inner liner, the inner liner having a closed bottom portion, a lower portion integral with and extending upwardly from said bottom portion, and a substantially cylindrical upper portion integral with and extending upwardly from the lower portion, the upper portion having an open neck and an upper rim; the liner further includes an interior surface, an exterior surface, and a mount means including an inwardly-projecting protrusion to facilitate engagement of the liner onto a core pin or rod.

16. A container as recited in claim 15, wherein the container includes a footed base for support.

17. A plastic container prepared from a multi-layered plastic preform, the container including an inner liner and a molded outer layer substantially adjacent to the plastic inner liner, the inner liner having a closed bottom portion, a lower portion integral with and extending upwardly from said bottom portion, and a substantially cylindrical upper portion integral with and extending upwardly from the lower portion, the upper portion having an open neck and an upper rim; the liner further includes an interior surface, an exterior surface, a longitudinal central axis, and at least one vent means recessed into the interior surface of the liner to permit the escape of gas from the interior of the liner when the liner is positioned on a core pin or rod.

18. A container as recited in claim 17, wherein the container includes a footed base for support.

* * * * *